(12) United States Patent
Kim

(10) Patent No.: US 8,691,430 B2
(45) Date of Patent: Apr. 8, 2014

(54) POUCH-TYPE LITHIUM SECONDARY BATTERY HAVING A VARIABLE TAB

(75) Inventor: Joongheon Kim, Suwon-si (KR)

(73) Assignee: Samsung SDI Co., Ltd., Yongin (KR)

( * ) Notice: Subject to any disclaimer, the term of this patent is extended or adjusted under 35 U.S.C. 154(b) by 768 days.

(21) Appl. No.: 12/643,750

(22) Filed: Dec. 21, 2009

(65) Prior Publication Data

US 2010/0173193 A1 Jul. 8, 2010

(30) Foreign Application Priority Data

Jan. 8, 2009 (KR) .................. 10-2009-0001452

(51) Int. Cl.
*H01M 2/06* (2006.01)
*H01M 2/26* (2006.01)

(52) U.S. Cl.
USPC .......................................... 429/179; 429/121

(58) Field of Classification Search
USPC .......................................... 429/178–181, 121
See application file for complete search history.

(56) References Cited

U.S. PATENT DOCUMENTS

| 6,218,041 | B1 | 4/2001 | Barbier et al. |
| 2001/0038938 | A1 | 11/2001 | Takahashi et al. |
| 2006/0266542 | A1 | 11/2006 | Yoon |
| 2007/0065718 | A1 | 3/2007 | Moon |
| 2008/0070067 | A1 | 3/2008 | Jang et al. |
| 2009/0297944 | A1 | 12/2009 | Oh et al. |
| 2010/0092859 | A1 | 4/2010 | Kim et al. |

FOREIGN PATENT DOCUMENTS

| CN | 101150204 | | 3/2008 |
| EP | 1 524 710 | A2 | 4/2005 |
| EP | 1 901 369 | | 3/2008 |
| JP | 2001-307696 | | 11/2001 |
| JP | 2002-358947 | A | 12/2002 |
| JP | 2003-045492 | A | 2/2003 |
| JP | 2004-127839 | A | 4/2004 |
| JP | 2006-324114 | | 11/2006 |
| JP | 2008-078117 | A | 4/2008 |
| JP | 2008-091036 | | 4/2008 |
| JP | 2010-529589 | A | 8/2010 |
| JP | 2010-205632 | A | 9/2010 |
| KR | 10-2006-0071813 | | 6/2006 |
| KR | 10-2006-0113802 | | 11/2006 |

OTHER PUBLICATIONS

Machine Translation of JP 2003-045492 originally published on Feb. 2003 to Kojima.*
EPO, Extended European Search Report for corresponding EPO application 09172907.9, Jan. 21, 2010.
U.S. Appl. No. 12/576,838, filed Oct. 9, 2009, Kim et al.
Office Action dated Feb. 22, 2012 for corresponding CN Application No. 200910215254.4.

* cited by examiner

*Primary Examiner* — Jonathan G Leong
(74) *Attorney, Agent, or Firm* — Knobbe, Martens, Olson & Bear, LLP

(57) ABSTRACT

The pouch-type lithium secondary battery includes an electrode assembly; a pouch for accommodating the electrode assembly; and a variable tab in electrical connection with one electrode tab of two electrode tabs of the electrode assembly and being parallel to the other electrode tab and being drawn outward from the pouch, wherein the position of the variable tab is adjustable with respect to the electrode tab in electrical connection therewith. Therefore, the present invention is capable of achieving easy positional adjustability of an electrode tab protruding outward from the pouch, during a battery assembly process. In addition, the present invention is capable of taking prompt measures in response to consumer demands by improving the design freedom of a battery pack particularly in a large-area battery.

14 Claims, 6 Drawing Sheets

POUCH-TYPE LITHIUM SECONDARY BATTERY HAVING A VARIABLE TAB

CLAIM FOR PRIORITY

This application is based on and claims priority to Korean Patent Application No. 10-2009-0001452 filed on Jan. 8, 2009 in the Korean Intellectual Property Office (KIPO), the entire contents of which are hereby incorporated by reference.

BACKGROUND OF THE INVENTION

1. Field of the Invention

The present invention relates to a secondary battery. More specifically, the present invention relates to a pouch-type lithium secondary battery with easy adjustability of an electrode tab position.

2. Description of the Related Art

With continuing recent trends towards weight reduction and higher functionalization of a variety of products including electric tools and portable wireless devices such as video cameras, cellular phones, notebook computers, and personal digital assistants (PDAs), there is increasing importance of the batteries used as a power source for these products. This interest has been matched by a great deal of research and study of these batteries.

Particularly, intensive interest has been given to rechargeable lithium secondary batteries which advantageously exhibit rapid chargeability and high energy density per unit weight due to the light nature of lithium atoms, as compared to conventional lead storage batteries, nickel-cadmium (NiCd) batteries, nickel-hydrogen batteries, nickel-zinc batteries, and the like.

Typically, lithium secondary batteries use a non-aqueous electrolyte due to potential reactivity of lithium with moisture. Such an electrolyte may include a lithium salt-containing solid polymer or a liquid electrolyte containing a lithium salt that is dissociated in an organic solvent. Generally, the organic solvent in which a lithium salt is dissolved may be ethylene carbonate, propylene carbonate, other alkyl group-containing carbonates, and the like. These solvents have boiling points of 50° C. or higher and very low vapor pressure at room temperature.

Lithium secondary batteries may be categorized into two groups including lithium metal batteries and lithium ion batteries that use liquid electrolytes and lithium ion polymer batteries that use solid polymer electrolytes.

The lithium ion polymer battery may employ a multilayer pouch composed of a metal foil layer and one or more polymer layers covering the metal foil, instead of a metal can of the lithium ion battery. Use of the multilayer pouch can advantageously result in significant weight reduction of a battery, as compared to use of the metal can. Usually, aluminum is used as a metal constituting a foil in the multilayer pouch. Further, a polymer layer forming an inner layer of the pouch film protects the metal foil against attack of an electrolyte and simultaneously inhibits possible short-circuits between positive and negative electrodes and/or between electrode tabs. The lithium secondary batteries using such a multilayer pouch are conventionally referred to as pouch-type lithium secondary batteries.

For fabrication of the pouch-type lithium secondary battery, a positive electrode, a separator and a negative electrode are first stacked, or stacked and wound to form an electrode assembly which is then placed in a pouch. Subsequently, an upper pouch film and a lower pouch film are thermally fused to each other in open edge portions of the pouch to form a bare cell battery of a sealed pouch type.

Accessories or structures such as a protection circuit module (PCM) or a positive temperature coefficient (PTC) device are attached to the bare cell battery to form a core pack battery.

By coupling the resulting core pack battery within a hard case, a complete hard pack battery is produced.

Conventionally, a pouch-type lithium secondary battery is of a generally square or rectangular pouch shape, and first and second electrode tabs connected to an electrode assembly are drawn outward from the pouch. Here, the first and second electrode tabs are always disposed at a certain distance from each other and attached to the electrode assembly.

However, a battery pack recently fabricated by the pouch-type lithium secondary battery should be designed with a different spacing between the first electrode tab and the second electrode tab, depending on the kinds of electronic devices.

To this end, relevant modifications of battery manufacturing processes should be made depending on design conditions of battery packs to which the batteries are applied upon fabrication of the pouch-type lithium secondary batteries.

BRIEF SUMMARY OF THE INVENTION

Therefore, the present invention has been made in view of the above problems, and it is an object of the present invention to provide a pouch-type lithium secondary battery which is fabricated to permit easy positional adjustability of electrode tabs protruding outward from a pouch.

It is another object of the present invention to provide a pouch-type lithium secondary battery which is adapted to improve the design freedom of a battery pack.

In accordance with the present invention, the above and other objects can be accomplished by the provision of a pouch-type lithium secondary battery including an electrode assembly; a pouch for accommodating the electrode assembly; and a variable tab in electrical connection with one electrode tab of two electrode tabs of the electrode assembly and being parallel to the other electrode tab and being drawn outward from the pouch.

Preferably, the variable tab includes a body and a bending portion which is formed by bending an end of the body.

Preferably, the electrode tab connected to the variable tab includes a tab-connecting portion which is formed by vertically bending an end of the tab.

Preferably, the variable tab and the electrode tab are connected to each other by inserting the tab-connecting portion of the electrode tab into the bending portion of the variable tab.

Preferably, the bending portion of the variable tab and the tab-connecting portion of the electrode tab are welded.

Preferably, the tab-connecting portion of the electrode tab is positioned parallel to a front sealing portion of the pouch.

Preferably, the bending portion of the variable tab and the electrode tab connected thereto are positioned within a front sealing portion of the pouch.

Preferably, the variable tab includes a body and a bending portion which is formed by vertically bending a portion of the body.

Preferably, the electrode tab connected to the variable tab includes a bending portion which is formed by bending an end of the electrode tab.

Preferably, the variable tab and the electrode tab are connected to each other by inserting the bending portion of the variable tab into the bending portion of the electrode tab.

Preferably, the bending portion of the variable tab and the bending portion of the electrode tab are welded.

Preferably, the bending portion of the variable tab is positioned parallel to a front sealing portion of the pouch.

Preferably, the bending portion of the variable tab and the electrode tab connected thereto are positioned within a front sealing portion of the pouch.

Preferably, the variable tab is formed of the same material as the electrode tab, or otherwise the variable tab is formed of an electrically conductive material.

Preferably, the variable tab is connected to the electrode tab attached to an outer periphery of the electrode assembly.

Preferably, the electrode tab to which the variable tab is connected is a positive electrode tab.

DETAILED DESCRIPTION OF THE INVENTION

Now, preferred embodiments of the present invention will be described in more detail with reference to the accompanying drawings.

Figure 1:
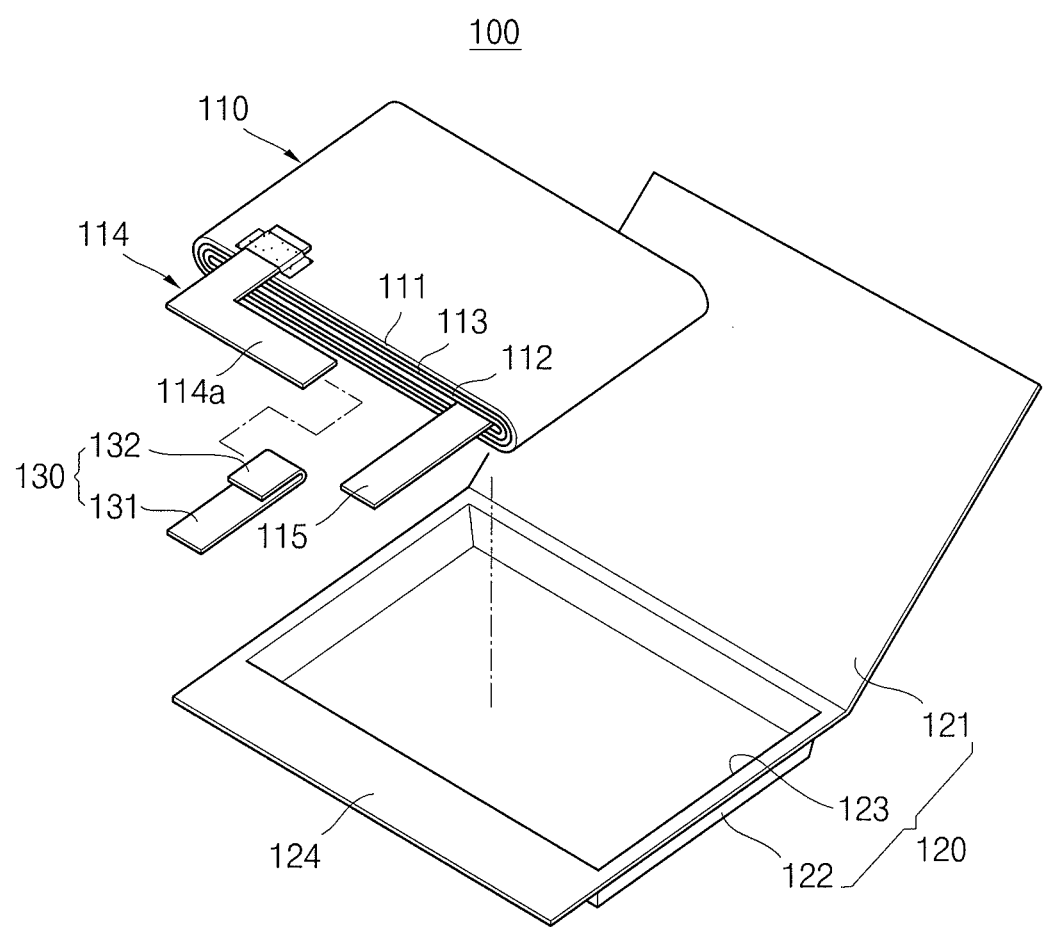
FIG. 1 is an exploded perspective view of a pouch-type lithium secondary battery in accordance with one embodiment of the present invention.
Figure 2:
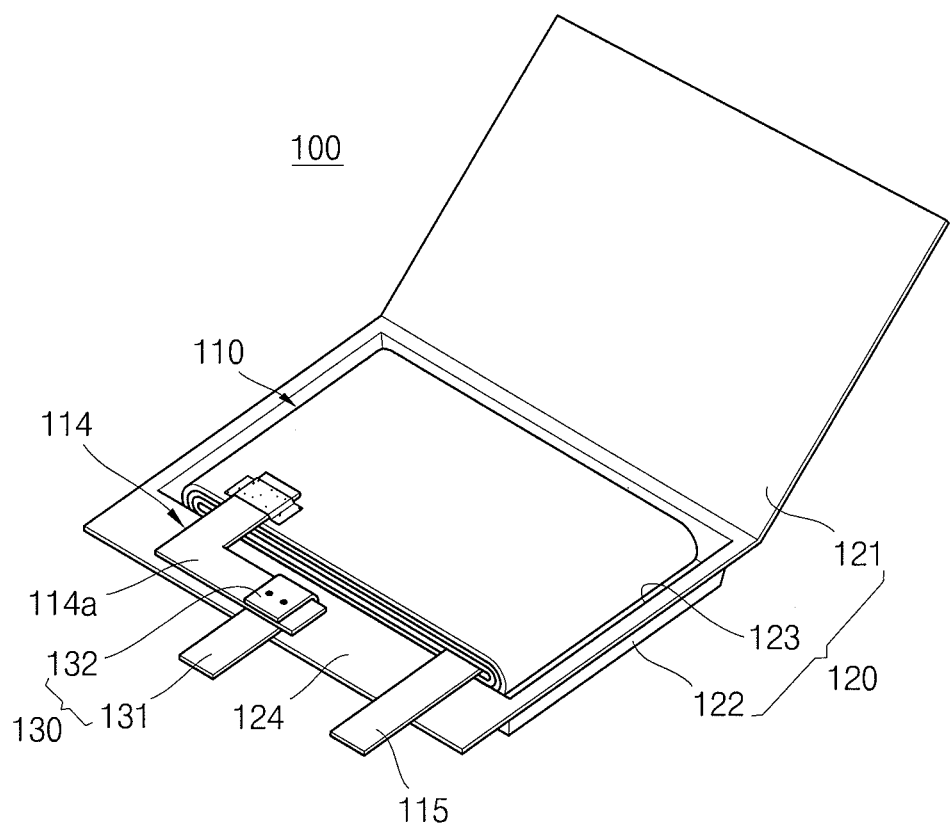
FIG. 2 is a perspective view showing insertion of an electrode assembly into a pouch in FIG. 1.
Figure 3:
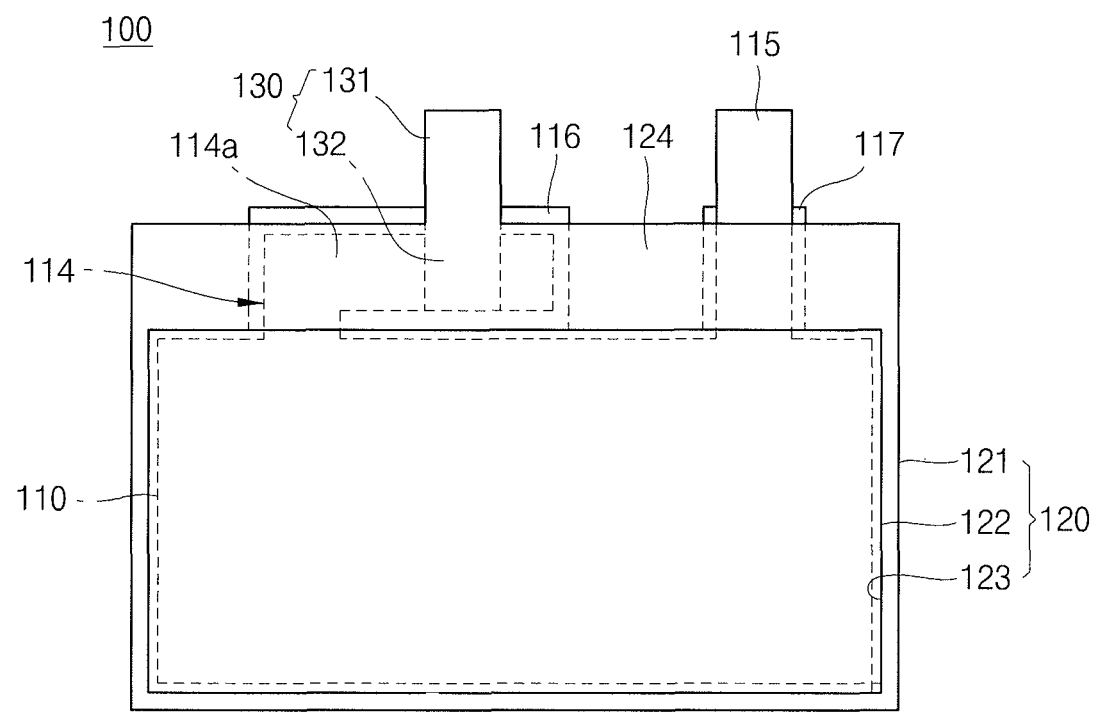
FIG. 3 is a front view of a pouch after assembly of the pouch is complete in FIG. 2.

FIG. 1 is an exploded perspective view of a pouch-type lithium secondary battery in accordance with one embodiment of the present invention, FIG. 2 is a perspective view showing insertion of an electrode assembly into a pouch in FIG. 1, and FIG. 3 is a front view of a pouch after assembly of the pouch is complete in FIG. 2, thus showing a reversed state of the pouch.

Referring to FIGS. 1 to 3, a pouch-type lithium secondary battery 100 in accordance with one embodiment of the present invention includes an electrode assembly 110; a pouch 120 for accommodating the electrode assembly 110, a variable tab 130 in electrical connection with at least one tab of a positive electrode tab 114 and a negative electrode tab 115 of the electrode assembly 110.

The electrode assembly 110 includes a positive electrode plate 111, a negative electrode plate 112, each having an electrode coating portion formed on a surface of a current collector, and an organic electrolyte-impregnated separator 113 sandwiched between the positive electrode plate 111 and the negative electrode plate 112. The electrode assembly 110 is fabricated by sequentially stacking the positive electrode plate 111, the negative electrode plate 112 and the separator 113 disposed therebetween, or winding the resulting stacked structure into a jelly-roll shape.

The positive electrode tab 114 is attached to one side of the positive electrode plate 111 of the electrode assembly 110, and the negative electrode tab 115 is attached to one side of the negative electrode plate 112. In the jelly-roll structure, the positive electrode tab 114 and the negative electrode tab 115 are arranged at a certain distance. The negative electrode tab 115 is partially protruded outward from the pouch 120, such that the electrode assembly 110 is electrically connected to the outside. The positive electrode tab 114 in connection with the variable tab 130 is housed in the pouch 120, and the variable tab 130 is protruded outward from the pouch 120.

The positive electrode tab 114 and the negative electrode tab 115 are typically formed of a metal, for example, aluminum, copper or nickel. Although there is no particular limit to materials for the positive electrode tab and the negative electrode tab, the positive electrode tab 114 is preferably formed of aluminum or aluminum alloy, and the negative electrode tab 115 is preferably formed of nickel or nickel alloy.

The pouch 120 is composed of an upper case 121 and a lower case 122 which are divided on the basis of the length direction of one side of a rectangular pouch film which is generally integrally formed. The lower case 122 is provided with a groove 123 for accommodation of the electrode assembly 110, by a conventional method such as pressing or the like. The pouch film constituting the upper and lower cases 121,122 of the pouch 120 is formed to have a stack structure where upper and lower surfaces of the pouch formed of aluminum foil are conventionally covered with a synthetic resin such as nylon, polypropylene, polyethylene, or the like. Further, the pouch inside is formed of a thermally adhesive resin. Therefore, the upper case 121 and the lower case 122 are sealed to each other by heating and pressing the thermally adhesive resin coated on the inner surface of the pouch film. For convenience of illustration, out of portions where the upper case 121 and the lower case 122 are sealed, a front portion is referred to as a front sealing portion 124.

The variable tab 130 is electrically connected to at least one electrode tab of the positive electrode tab 114 or the negative electrode tab 115. Preferably, the variable tab 130 is connected to the electrode tab attached to an outer periphery of the electrode assembly 110.

In one embodiment of the present invention, the positive electrode tab 114 is attached to the positive electrode plate 111 in the outer periphery of the electrode assembly 110, and the variable tab 130 is connected to the positive electrode tab 114.

The variable tab 130 includes a body 131 and a bending portion 132 formed by bending an end of the body 131. The positive electrode tab 114 is provided with a tab-connecting portion 114a which is formed by vertically bending an end of the tab 114.

Therefore, the bending portion 132 formed at the end of the variable tab 130 is connected to the tab-connecting portion 114a of the positive electrode tab 114. That is, connection of the variable tab 130 to the positive electrode tab 114 is made by insertion of the tab-connecting portion 114a of the positive electrode tab 114 through a gap formed between the body 131 and the bending portion 132 of the variable tab 130.

The tab-connecting portion 114a of the positive electrode tab 114 is disposed substantially parallel to the front sealing portion 124 of the pouch. The tab-connecting portion 114a is formed to have a length to ensure that the variable tab 130 can move in the right and left directions with respect to the front sealing portion 124.

The variable tab 130 is formed of the same material as the positive electrode tab 114, or is formed of an electrically conductive material.

Hereinafter, the operation of the pouch-type lithium secondary battery in accordance with one embodiment of the present invention as constructed above will be described.

With interposition of the separator 113 between the positive electrode plate 111 and the negative electrode plate 112, the wound electrode assembly 110 is inserted into the groove 123 on the lower case 122 of the pouch 120. Accordingly, the positive electrode tab 114 and the negative electrode tab 115 in the electrode assembly 110 are drawn outward from the lower case 122. In this connection, the positive electrode tab 114 is positioned in the front sealing portion 124 of the lower case 122, and the negative electrode tab 115 is protruded outward from the front sealing portion 124.

The variable tab 130 is connected to the tab-connecting portion 114a of the positive electrode tab 114. In other words, the tab-connecting portion 114a of the positive electrode tab 114 is fitted into the bending portion 132 of the variable tab 130. Then, the variable tab 130 is slid in the tab-connecting portion 114a of the positive electrode tab 114. Because the variable tab 130 can be displaced in the right and left directions in correspondence to a length of the tab-connecting portion 114a, the position of the positive electrode tab 114 can be easily adjusted with respect to the original position of the positive electrode tab 114 drawn from the electrode assembly 110, depending on design conditions of the battery pack or other requirements during manufacturing processes thereof.

After the position of the variable tab 130 is adjusted on the tab-connecting portion 114a of the positive electrode tab 114, the bending portion 132 and the tab-connecting portion 114a are welded. As a result, the variable tab 130 and the positive electrode tab 114 are electrically connected, and the variable tab 130 is also fixed to the positive electrode tab 114.

The upper case 121 of the pouch 120 is heat-sealed to the lower case 122, so the variable tab 130 is drawn outward from the pouch 120. In addition, the negative electrode tab 115 is also drawn outward from the pouch 120. Insulating tapes 116,117 are attached to the positive electrode tab 114 and the negative electrode tab 115 drawn through the front sealing portion 124, such that a short-circuit is prevented between the positive electrode tab 114 and the negative electrode tab 115.

In the as assembled pouch-type lithium secondary battery, the positive electrode tab 114 is electrically connected to the variable tab 130, so the variable tab 130 serves as the positive electrode tab 114.

Hereinafter, a pouch-type lithium secondary battery in accordance with another embodiment of the present invention will be described.

Figure 4:
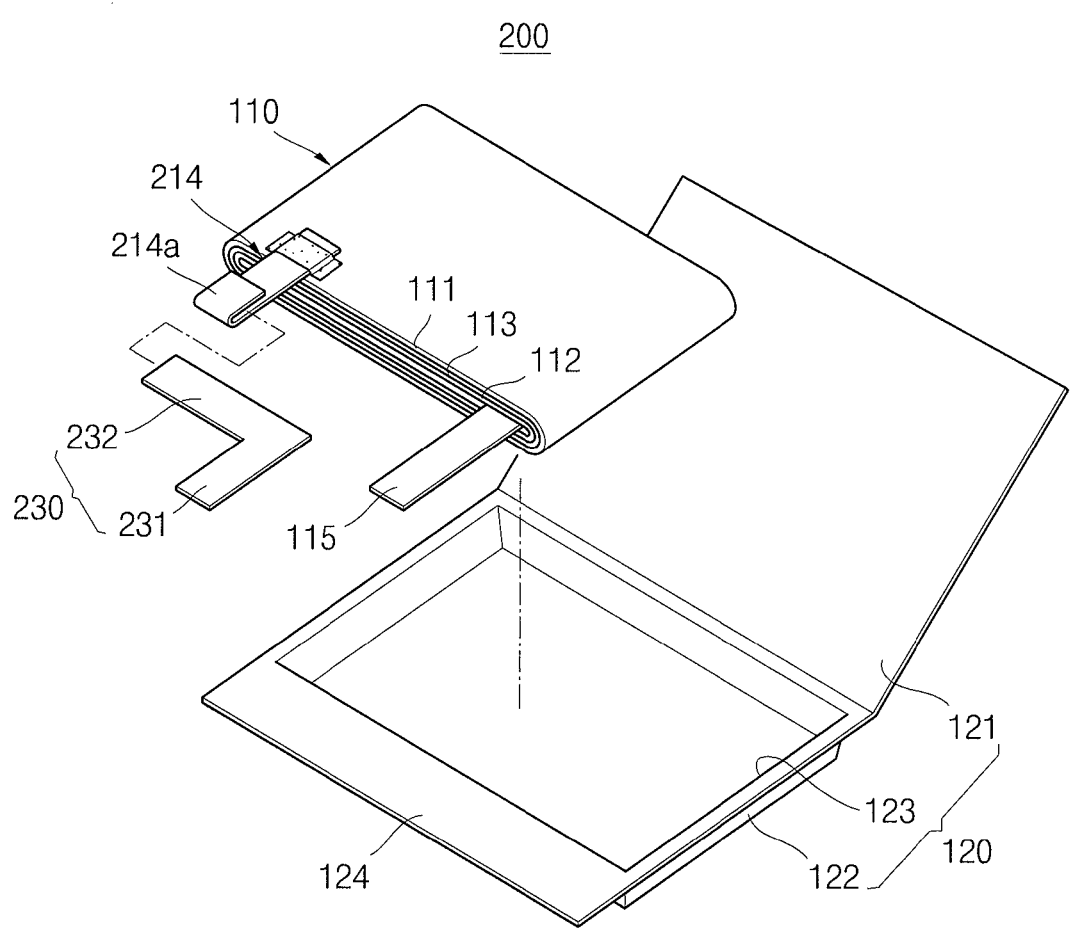
FIG. 4 is an exploded perspective view of a pouch-type lithium secondary battery in accordance with another embodiment of the present invention.
Figure 5:
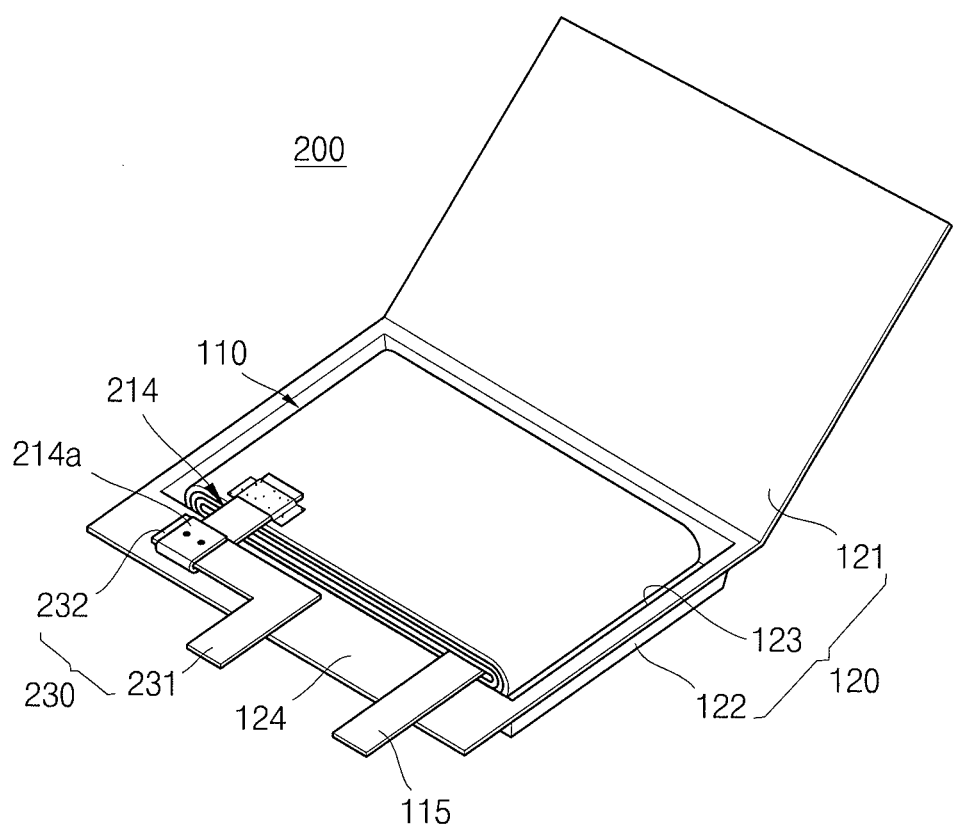
FIG. 5 is a perspective view showing insertion of an electrode assembly into a pouch in FIG. 4.
Figure 6:
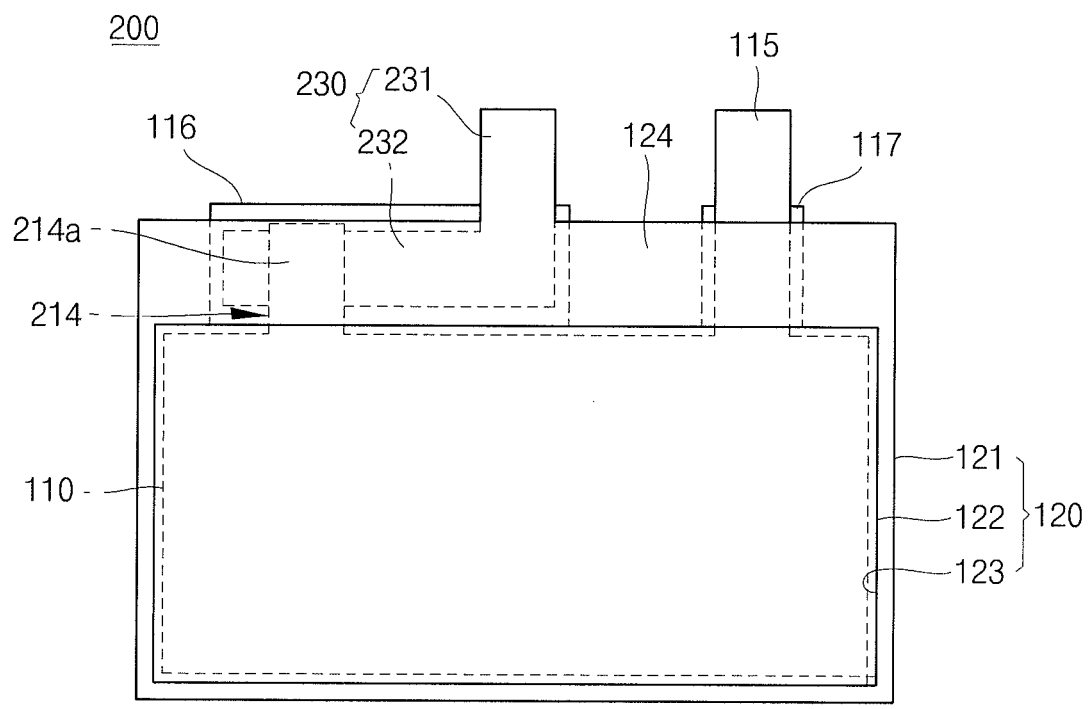
FIG. 6 is a front view of a pouch after assembly of the pouch is complete in FIG. 4.

Referring to FIGS. 4 to 6, a pouch-type lithium secondary battery 200 includes an electrode assembly 110; a pouch 120 for accommodating the electrode assembly 110; and a variable tab 230 in electrical connection with at least one tab of a positive electrode tab 214 and a negative electrode tab 115 of the electrode assembly 110.

Configurations of the electrode assembly 110, the negative electrode tab 115 and the pouch 120 are the same as those of the previous embodiment of the present invention and details thereof will be omitted herein. Like numbers refer to like elements throughout the specification and drawings.

The variable tab 230 is electrically connected to at least one electrode tab of the positive electrode tab 214 and the negative electrode tab 115. In another embodiment of the present invention, the variable tab 230 is connected to the positive electrode tab 214 attached to an outer periphery of the electrode assembly 110.

The variable tab 230 includes a body 231 and a bending portion 232 which is vertically bent with respect to the body 231. An end of the positive electrode tab 214 is provided with a bending portion 214a.

The variable tab 230 is connected to the bending portion 214a of the positive electrode tab 214. In other words, the bending portion 232 of the variable tab 230 is inserted through the bending portion 214a of the positive electrode tab 214, such that the variable tab 230 is connected to the positive electrode tab 214. The bending portion 232 of the variable tab 230 is lengthwise installed parallel to the front sealing portion 124 of the pouch.

The variable tab 230 is formed of the same material as the positive electrode tab 214, or is formed of an electrically conductive material. Although there is no particular limit to materials for the positive electrode tab and the negative electrode tab, the positive electrode tab 214 is preferably formed of aluminum or aluminum alloy, and the negative electrode tab 115 is preferably formed of nickel or nickel alloy.

Hereinafter, the operation of the pouch-type lithium secondary battery in accordance with another embodiment of the present invention as constructed above will be described.

With interposition of the separator 113 between the positive electrode plate 111 and the negative electrode plate 112, the wound electrode assembly 110 is inserted into the groove 123 on the lower case 122 of the pouch 120. Accordingly, the positive electrode tab 214 and the negative electrode tab 115 in the electrode assembly 110 are drawn outward from the lower case 122. In this connection, the positive electrode tab 214 is positioned within the front sealing portion 124 of the lower case 122, and the negative electrode tab 115 is protruded outward from the front sealing portion 124.

The variable tab 230 is connected to the positive electrode tab 214. That is, the bending portion 232 of the variable tab 230 is inserted into the bending portion 214a of the positive electrode tab 214. In this connection, the bending portion 232 of the variable tab 230 is movable in the bending portion 214a of the positive electrode tab 214. Accordingly, the bending portion 232 of the variable tab 230 is slidable with respect to the bending portion 214a of the positive electrode tab 214, so a position of the body 231 of the variable tab 230 is adjusted.

In this manner, the position of the variable tab 230 is easily adjusted with respect to the position where the positive electrode tab 214 is drawn from the electrode assembly 110.

After the position of the variable tab 230 is adjusted with respect to the positive electrode tab 214, the bending portion 232 of the variable tab 230 and the bending portion 214a of the positive electrode tab 214 are welded. As a result, the variable tab 230 and the positive electrode tab 214 are electrically connected, simultaneously with fixation of the variable tab 230 to the positive electrode tab 214.

The upper case 121 of the pouch 120 is heat-sealed to the lower case 122, so the variable tab 230 and the negative electrode tab 115 are drawn outward from the pouch 120. Here, the positive electrode tab 214 and the bending portion 232 of the variable tab 230 are positioned within the front sealing portion 124.

The positive electrode tab 214, the bending portion 232 of the variable tab 230 and the negative electrode tab 115 are provided with the attachment of insulating tapes 116,117, so short-circuits are inhibited therebetween.

In the as-assembled pouch-type lithium secondary battery, the positive electrode tab 214 is in electrical connection with the variable tab 230, so the variable tab 230 serves as the positive electrode tab 214.

As described before, the present invention is capable of achieving easy positional adjustability of an electrode tab protruding outward from a pouch, during a battery assembly process.

The present invention is also capable of taking prompt measures in response to consumer demands by improving the design freedom of a battery pack particularly in a large-area battery.

Although the foregoing description has shown, illustrated and described various implementations and embodiments of the present invention, it will be appreciated that various modifications and changes to the form and the detail of the described embodiments may be made by those skilled in the art without departing from the spirit of the present invention. Hence, the scope of the present invention should not be limited to the foregoing discussion but should be defined by the appended claims.

What is claimed is:

1. A pouch-type lithium secondary battery comprising:
an electrode assembly having two electrode tabs;
a pouch for accommodating the electrode assembly; and
a variable tab in electrical connection with a first electrode tab of the two electrode tabs of the electrode assembly and being substantially parallel to the other of the two electrode tabs and being drawn outward from the pouch wherein the variable tab has a bending portion that defines an opening that receives the first electrode tab so that the variable tab and the first electrode tab are engaged to each other within the pouch so that the variable tab is at a position selected from a range of different positions in a direction substantially perpendicular to the first electrode tab and so that the variable tab extends outward from the pouch at the selected position.

2. The battery according to claim 1, wherein the variable tab includes a body and a bending portion which is formed by bending an end of the body.

3. The battery according to claim 1, wherein the first electrode tab connected to the variable tab includes a tab-connecting portion which is formed by vertically bending an end of the first electrode tab.

4. The battery according to claim 2, wherein the variable tab and the first electrode tab are connected to each other by inserting a tab-connecting portion of the first electrode tab into the bending portion of the variable tab.

5. The battery according to claim 4, wherein the bending portion of the variable tab and the tab-connecting portion of the first electrode tab are welded.

6. The battery according to claim 3, wherein the tab-connecting portion of the first electrode tab is positioned substantially parallel to a front sealing portion of the pouch.

7. The battery according to claim 2, wherein the bending portion of the variable tab and the first electrode tab connected thereto are positioned within the front sealing portion of the pouch.

8. The battery according to claim 1, wherein the variable tab is formed of the same material as the first electrode tab.

9. The battery according to claim 1, wherein the variable tab is formed of an electrically conductive material.

10. The battery according to claim 1, wherein the variable tab is connected to the first electrode tab attached to an outer periphery of the electrode assembly.

11. The battery according to claim 1, wherein the first electrode tab to which the variable tab is connected is a positive electrode tab.

12. A pouch-type lithium secondary battery comprising:
an electrode assembly having a first and a second electrode tab, attached thereto and extending outward from the electrode assembly in a first direction;
a pouch for accommodating the electrode assembly;
a variable electrode tab coupled to the first electrode tab, wherein the variable electrode tab and the first electrode tab define an engagement surface within the pouch that extends for a first length in a second direction that intersects the first direction and wherein the variable electrode tab has a bending portion that defines an opening that receives the first electrode tab so that the variable electrode tab and the first electrode tab are connected to each other so that the variable electrode tab and the first electrode tab are relatively positioned with respect to each other at one of a plurality of different locations along the first length of the engagement surface.

13. The battery of claim 12, wherein the first electrode tab includes a first member that is coupled to the electrode assembly and extends in the first direction and a second member that extends substantially perpendicular to the first direction and wherein the second member defines the engagement surface.

14. The battery of claim 13, wherein the variable electrode tab defines a bent portion that extends about the engagement surface to permit movement of the variable electrode tab with respect to the engagement surface prior to fixably connection therebetween.

* * * * *